Sept. 22, 1931.     O. W. DUNHAM     1,824,335
CROWN BLOCK BEARING
Filed April 8, 1930     3 Sheets-Sheet 1
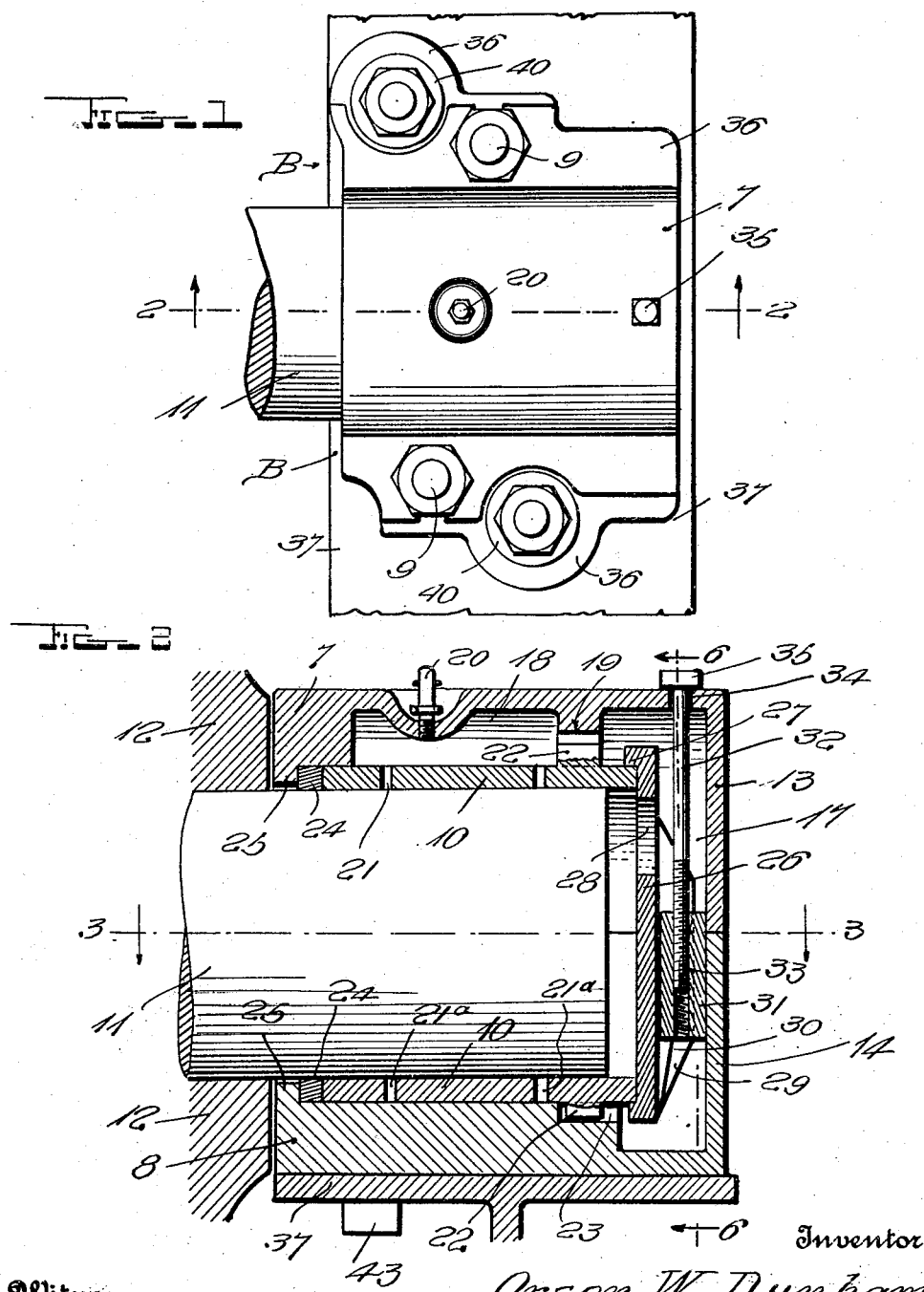

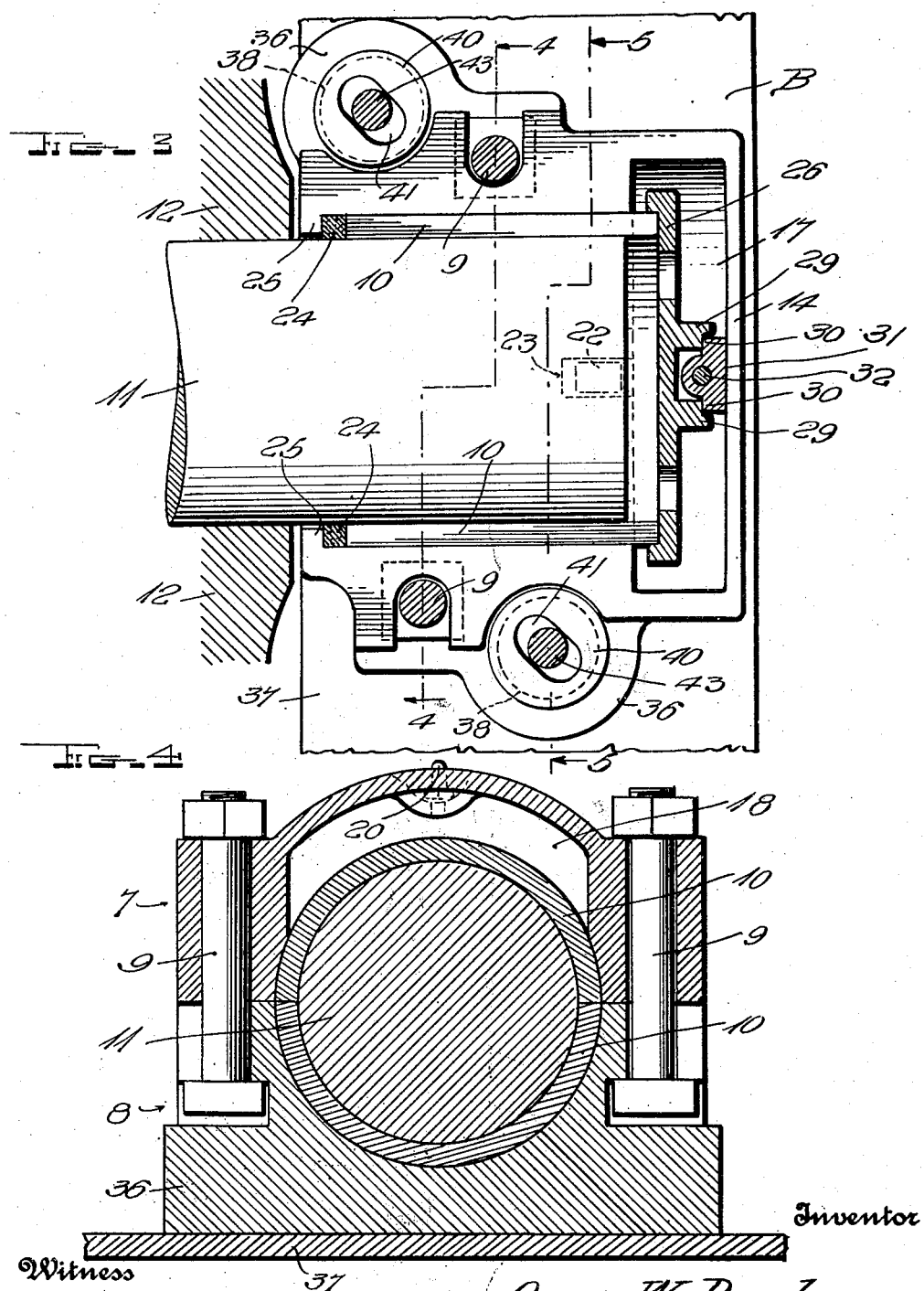

Sept. 22, 1931.     O. W. DUNHAM     1,824,335
CROWN BLOCK BEARING
Filed April 8, 1930     3 Sheets-Sheet 3
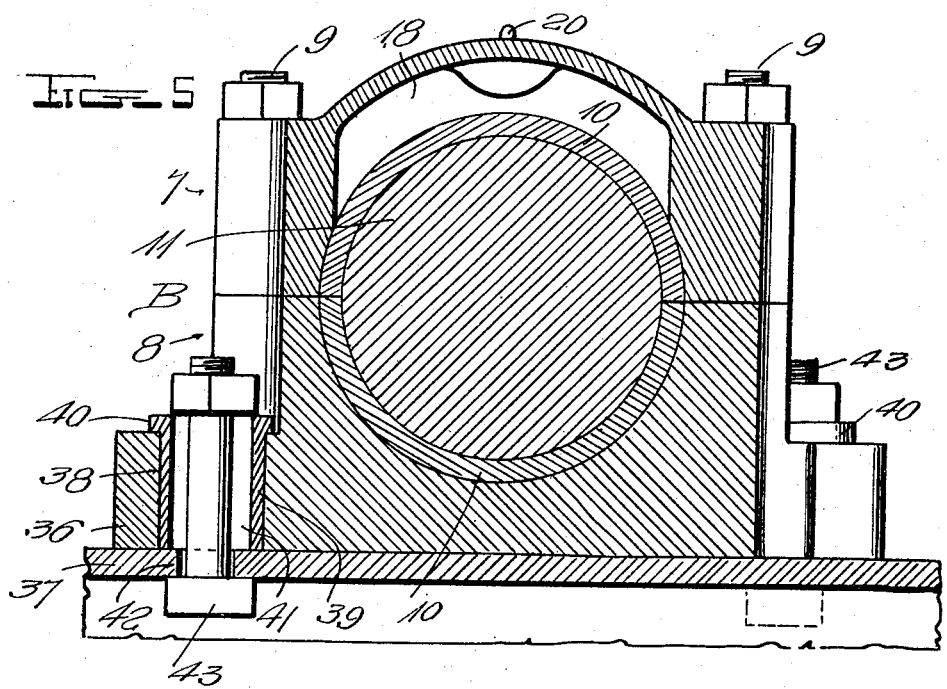
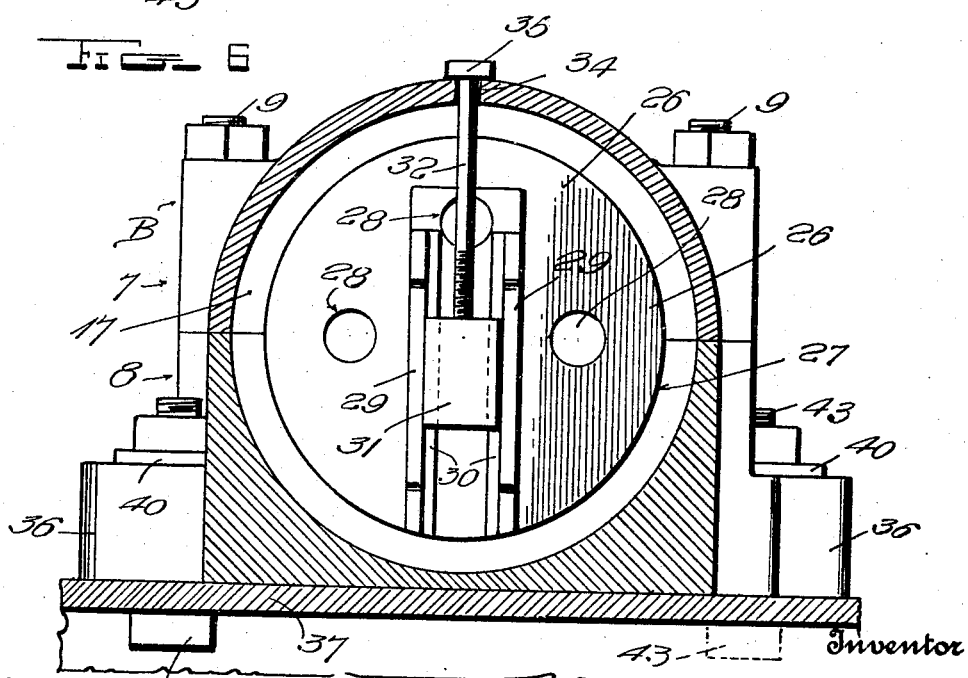
Orson W. Dunham,
Inventor Patented Sept. 22, 1931

1,824,335

UNITED STATES PATENT OFFICE

ORSON W. DUNHAM, OF WEBB CITY, MISSOURI

CROWN BLOCK BEARING

Application filed April 8, 1930. Serial No. 442,618.

The invention relates to improvements in crown block bearings of the general type shown in my pending U. S. application Serial No. 265,636, filed March 29, 1928, U. S. Patent 1,758,357, May 13, 1930, and it is the principal object of the present invention to generally improve and simplify the construction of the bearing, cheapening manufacture and cost to the user without in any manner decreasing efficiency.

A further aim is to provide novel means for mounting the bearing upon one of the usual I-beams of the crown block, said mounting means being such as to permit alinement thereof with some of the usual bolt-holes in the I-beam and to allow some degree of horizontal shifting on the part of the bearing, so that the usual sheaves whose shafts are mounted in the improved bearings, may be positioned in the most advantageous manner to prevent excessive dragging of the cables against one side or the other of said sheaves.

With the foregoing in view, the invention resides in the novel subject matter hereinafter described and claimed, description being accomplished by reference to the accompanying drawings.

Fig. 1 is a top plan view.

Fig. 2 is a vertical longitudinal sectional view as indicated by line 2—2 of Fig. 1.

Fig. 3 is a horizontal sectional view on line 3—3 of Fig. 2.

Fig. 4 is a vertical transverse section on line 4—4 of Fig. 3.

Fig. 5 is a view similar to Fig. 4, cut on line 5—5 of Fig. 3.

Fig. 6 is a transverse sectional view on line 6—6 of Fig. 2.

A bearing body B is shown preferably composed of upper and lower sections 7—8 respectively, secured together by bolts 9, said sections being internally shaped to receive a bushing sleeve 10 for one end of the shaft 11 of one of the usual sheaves 12. The sections 7—8 are provided at their outer ends with integral closures 13—14 which jointly seal the outer end of the bearing. At the inner side of the closure 13—14, the body sections 7—8 are recessed to provide a chamber 17 for hard grease, and in inwardly spaced relation with this chamber, the body section 7 is recessed to provide an additional lubricant chamber 18, the two chambers being in communication with each other, for instance, through a notch 19 in said body section 7. This section carries a nipple 20 by means of which hard grease may be introduced into the chamber 18, and from this chamber the grease will pass through the notch 19 into the chamber 15, so that a large quantity of the grease may be held in storage and consequently the bearing will be well lubricated for a long period of time without attention. Openings 21 are preferably formed in the bushing sleeve 10 to permit passage of lubricant from the chamber 18 and the lower side of this bushing is preferably provided also with corresponding openings 21a. These openings 21a are normally idle, but when the lower side of the bushing has been worn, this bushing may be completely inverted exposing its previously unworn portion to the wear of the shaft 11, and when the bushing is in this inverted position, the openings 21a act in the same capacity as the openings 21. By preference, the bushing sleeve 10 is formed of upper and lower halves, each provided with a lug 22, one of these lugs being receivable in the notch 19 and the other in a groove 23 formed in the body section 8, so that the sleeve is held against rotation. The inner end of this sleeve abuts an annular packing 24 around the shaft 11, and the inner ends of the body sections 7—8 are jointly formed with a continuous shoulder 25 abutting said packing. Hence, by inwardly forcing the sleeve 10, this packing is compressed and caused to tightly contact with the shaft to prevent leakage of lubricant and to exclude foreign matter. Novel provision is made for inwardly sliding the bushing sleeve 10 in this manner.

A cap 26 contacts with the outer end of the sleeve 10 and is outwardly spaced from the shaft 11, said cap being preferably separate from the sleeve 10 and having an annular flange 27 surrounding the latter. This cap is formed with openings 28 through which lubricant may pass from the chamber 15. The outer side of cap 26 is provided with two parallel vertical flanges 29 having longitudinal shoulders 30 at their inner sides and facing away from said cap, said shoulders converging upwardly with respect to the closure 13—14. A wedge-block 31 is slidably received between the flanges 29 and said block contacts with the shoulders 30 and with the closure 13—14, so that upon upward sliding of said wedge-block, the cap 26 will be crowded inwardly, thereby inwardly forcing the bushing sleeve 10 to compress the packing 24.

For upwardly shifting the wedge-block, I provide a vertical screw 32 whose lower end has a threaded connection 33 with said block. The upper end of this screw passes rotatably through an opening 34 in the body section 7 and is provided with a head 35 for engagement with a wrench. Whenever it is advisable to tighten the packing 24, it is only required that the screw 32 be tightened.

The lower body section 8 is provided with a base 36 which projects laterally in opposite directions from the major portion of the body B and is adapted to rest upon one of the usual I-beams 37 of a crown block. The ends of this base are formed with cylindrical, vertical openings 38 in which cylindrical plugs 39 are rotatably received, said plugs having flanges 40 at their upper ends lying upon the base 36. Each plug 39 is provided from its upper to its lower end with a slot 41 which is widened diametrically of the plug 39. By turning the plugs 39 to the proper extent, their slots 41 may be placed in registration with the usual bolt-holes 42 of the I-beam 37, allowing the insertion of bolts 43 for fastening the entire bearing to said I-beam. Moreover, the rotatable plugs 39 and their slots 41 permit horizontal shifting of the bearing in numerous ways before tightening the bolts 43, so that the sheave 12 may be most advantageously positioned and so aligned with the point of pull below as to prevent the cable from dragging upon one side or the other of said sheave.

It will be seen from the foregoing that while the invention is of rather simple and inexpensive nature, it will be highly efficient and desirable. Excellent results are obtainable from the details disclosed and they are therefore preferably followed. However, within the scope of the invention as claimed, variations may be made.

No broad claim is herein made to the shoulder 25, the packing 24, the sleeve 10 and the means for inwardly forcing this sleeve to compress the packing, in view of the claims in my prior U. S. application Serial No. 265,636, filed March 29, 1928, U. S. Patent 1,758,357, May 13, 1930.

I claim:—

1. A bearing comprising a body closed at one end and open at its other end to receive the end of a shaft, the last named end of said body having an internal shoulder to surround the shaft, an annular packing abutting the inner side of said shoulder, a shaft-receiving bushing sleeve in said body having one of its ends disposed against said packing, a cap for the other end of said bushing sleeve, a wedge slidable transversely of said sleeve and interposed between said cap and the closed outer end of said body for inwardly sliding said cap and sleeve to compress said packing, and means extending from said wedge to the exterior of said body for operating the former.

2. A bearing comprising a body closed at one end and open at its other end to receive the end of a shaft, the last named end of said body having an internal shoulder to surround the shaft, an annular packing abutting the inner side of said shoulder, a shaft-receiving bushing sleeve in said body having one of its ends disposed against said packing, a cap for the other end of said bushing sleeve, the outer side of said cap being provided with parallel flanges and with shoulders at the inner sides of said flanges facing the closed end of said body and converging with the latter, a wedge-block positioned slidably between said flanges and contacting with said shoulders and said closed end of said bearing, and means extending from said wedge-block to the exterior of said body for sliding the former to inwardly force said cap and sleeve to compress said packing.

3. A bearing comprising a body closed at one end and open at its other end to receive the end of a shaft, the last named end of said body having an internal shoulder to surround the shaft, an annular packing abutting the inner side of said shoulder, a shaft-receiving bushing sleeve in said body having one of its ends disposed against said packing, a cap for the other end of said bushing sleeve, the outer side of said cap being provided with parallel flanges and with shoulders at the inner sides of said flanges facing the closed end of said body and converging with the latter, a wedge-block positioned slidably between said flanges and contacting with said shoulders and said closed end of said bearing, and a screw having a threaded engagement with said wedge-block, said screw extending to the exterior of said bearing body and having a wrench-engaging head whereby it may be rotated, thereby moving the wedge-block to inwardly force the aforesaid cap and sleeve for the purpose of compressing said packing.

In testimony whereof I have hereunto affixed my signature.

ORSON W. DUNHAM.